United States Patent [19]

Kalnoki-Kis

[11] 4,218,523

[45] Aug. 19, 1980

[54] NONAQUEOUS ELECTROCHEMICAL CELL

[75] Inventor: Tibor Kalnoki-Kis, Westlake, Ohio

[73] Assignee: Union Carbide Corporation, New York, N.Y.

[21] Appl. No.: 15,938

[22] Filed: Feb. 28, 1979

[51] Int. Cl.² .............................................. H01M 6/14
[52] U.S. Cl. ..................................... 429/101; 429/196
[58] Field of Search ........................... 429/101, 196, 48

[56] References Cited

U.S. PATENT DOCUMENTS

| 3,993,501 | 11/1976 | Kalnoki-Kis | 429/101 |
| 3,998,657 | 12/1976 | Auborn et al. | 429/196 |
| 4,093,784 | 6/1978 | Driscoll | 429/101 |
| 4,139,680 | 2/1979 | Schlaikjer | 429/196 |

Primary Examiner—Donald L. Walton
Attorney, Agent, or Firm—Cornelius F. O'Brien

[57] ABSTRACT

A non-aqueous cell comprising an active metal anode, such as lithium, a liquid cathode-electrolyte comprising a solute dissolved in a solvent which is an oxyhalide of an element of Group V or Group VI of the Periodic Table and wherein elemental sulfur or a sulfur compound is incorporated into the cathode-electrolyte so as to substantially eliminate initial voltage delay of the cell during discharge.

16 Claims, 10 Drawing Figures

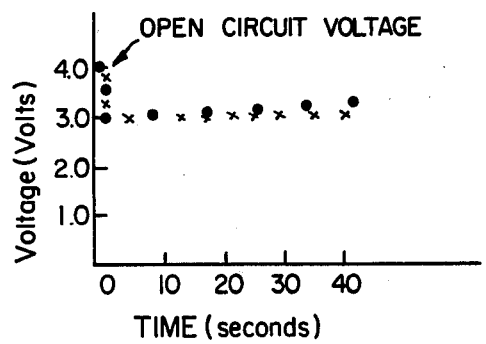
FIG. 7
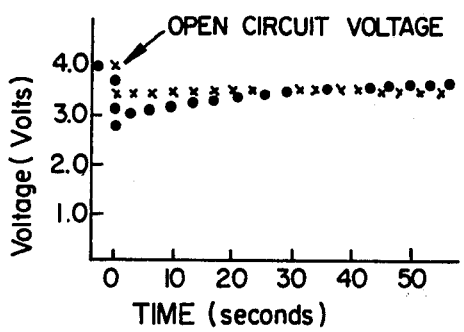
FIG. 8
FIG. 9a
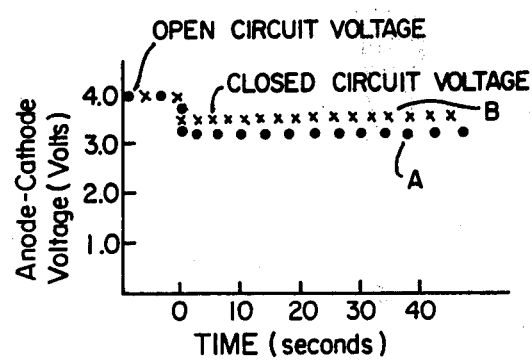
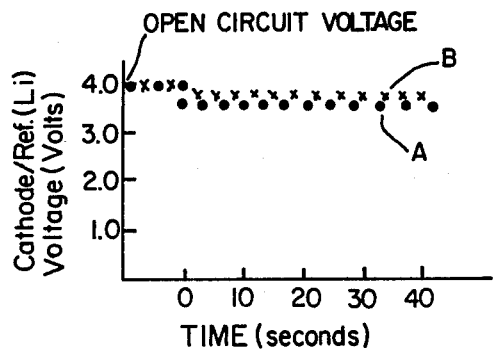
FIG. 9b

NONAQUEOUS ELECTROCHEMICAL CELL

FIELD OF THE INVENTION

The invention relates to a nonaqueous cell employing an active metal anode in conjunction with an oxyhalide cathode-electrolyte wherein elemental sulfur or a sulfur compound is added to the cathode-electrolyte to effectively suppress the initial voltage delay during cell discharge.

BACKGROUND OF THE INVENTION

The development of high energy battery systems requires, among other things, the compatibility of an electrolyte possessing desirable electrochemical properties with highly reactive anode materials, such as lithium or the like. The use of aqueous electrolytes is precluded in these systems since the anode materials are sufficiently active to react with water chemically. It has, therefore, been necessary, in order to realize the high energy density obtainable through use of these highly reactive anodes, to turn to the investigation of nonaqueous electrolyte systems.

The term "nonaqueous electrolyte" as used herein refers to an electrolyte which is composed of a solute, such as, for example, a metal salt or a complex salt of Group IA, Group IIA, Group IIIA or Group VA elements of the Periodic Table, dissolved in an appropriate nonaqueous solvent. The term "Periodic Table" as used herein refers to the Periodic Table of Elements as set forth on the inside back cover of the Handbook of Chemistry and Physics, 48th Edition, The Chemical Rubber Co., Cleveland, Ohio, 1967–1968.

A multitude of solutes is known and many have been suggested for use but the selection of a suitable solvent has been particularly troublesome. The ideal battery electrolyte would comprise a solvent-solute pair which has a long liquid range, high ionic conductivity and stability. A long liquid range, i.e., high boiling point and low freezing point, is essential if the battery is to operate at other than normal ambient temperatures. High ionic conductivity is necessary if the battery is to have high rate capability. Stability is necessary with the electrode materials, the materials of cell construction, and the products of the cell reaction to provide long shelf life when used in a primary or secondary battery system.

It has recently been disclosed in the literature that certain materials are capable of acting both as an electrolyte carrier, i.e., as solvent for the electrolyte salt, and as the active cathode for a nonaqueous electrochemical cell. U.S. Pat. Nos. 3,475,226, 3,567,515 and 3,578,500 each disclose that liquid sulfur dioxide or solutions of sulfur dioxide and a co-solvent will perform this dual function in nonaqueous electrochemical cells. While these solutions perform their dual function, they are not without several disadvantages in use. Sulfur dioxide is always present and, being a gas at ordinary temperatures, it must be contained in the cell as a liquid under pressure or dissolved in a liquid solvent. Handling and packaging problems are created if the sulfur dioxide is used alone, and an additional component and assembly step is necessary if sulfur dioxide is to be dissolved in a liquid solvent. As stated above, a long liquid range encompassing normal ambient temperatures is a desirable characteristic in an electrolyte solvent. Obviously, sulfur dioxide is deficient in this respect at atmospheric pressure.

U.S. application Ser. No. 439,521 by G. E. Blomgren et al, filed Feb. 4, 1974, which is a continuation-in-part of application Ser. No. 212,582 filed on Dec. 27, 1971, now abandoned discloses a nonaqueous electrochemical cell comprising an anode, a cathode collector and a cathode-electrolyte, said cathode-electrolyte comprising a solution of an ionically conductive solute dissolved in an active cathode depolarizer wherein said active cathode depolarizer consists of a liquid oxyhalide of an element of Group V or Group VI of the Periodic Table. Although oxyhalides can be used effectively as a component part of a cathode-electrolyte in conjunction with an active metal anode, such as a lithium anode, to produce a good high energy density cell, it has been observed that if the cell is stored for a prolonged period of about three days or longer, passivation of the anode appears to occur which results in undesirable voltage delays at the beginning of discharge along with high cell impedance.

U.S. Pat. No. 3,993,501 to T. Kalnoki-Kis discloses one approach for minimizing or preventing undesirable voltage delays at the beginning of discharge of nonaqueous cells employing an oxyhalide-containing cathode-electrolyte by providing a vinyl polymer film coating on the surface of the anode that contacts the cathode-electrolyte. The disclosure made in this patent is incorporated herein by reference.

One of the primary objects of this invention is to substantially prevent the passivation of the active metal anode in oxyhalide cathode-electrolyte cells.

Another object of this invention is to provide an oxyhalide cathode-electrolyte cell wherein elemental sulfur or a sulfur compound is employed in the cathode-electrolyte so as to substantially prevent the passivation of the active metal anode during cell storage and usage.

Another object of this invention is to provide an oxyhalide cathode-electrolyte cell system wherein the surface of the active metal anode that is in contact with the liquid oxyhalide cathode-electrolyte of the cell is coated with a thin adherent vinyl polymer film as per the teaching of U.S. Pat. No. 3,993,501 and wherein elemental sulfur or a sulfur compound is employed in the cathode-electrolyte so as to effectively prevent the passivation of the active metal anode during cell storage and usage.

The foregoing and additional objects will become more fully apparent from the following description.

SUMMARY OF THE INVENTION

The invention relates to a high energy density nonaqueous cell comprising an active metal anode, a cathode collector and an ionically conductive cathode-electrolyte solution containing a solute dissolved in at least one liquid oxyhalide of an element of Group V or Group VI of the Periodic Table, with or without a reactive or nonreactive cosolvent, the improvement comprising incorporating into said cathode-electrolyte at least one sulfur-containing member represented by the formula $M_xS_yY_z$ wherein M is an alkali or alkaline earth metal, S is sulfur and Y is chlorine or bromine and wherein x is an integer having a value of 0 to 2, y is an integer having a value of 1 to 14, preferably 1 to 6, and z is an integer having a value of 0 to 2. When z is other than 0 then x is 0, and when x is other than 0 then z is 0. In accordance with this invention, the sulfur-containing member added to the cathode-electrolyte will substantially eliminate initial voltage delay of the cell during discharge.

The sulfur-containing member could be elemental sulfur, sulfide, a polysulfide, a combination of sulfides, sulfur chloride or a sulfur bromide. Suitable sulfur compounds for use in this invention would be lithium sulfide, sulfur dichloride, sulfur monochloride or mixtures thereof. The preferred sulfur-containing member is lithium sulfide which can be employed with or without another sulfur-containing member, such as sulfur monochloride.

The concentration of the elemental sulfur to be added in accordance with this invention can be from about 1 weight percent based on the weight of the cathode-electrolyte up to the limit of solubility of the sulfur in the cathode-electrolyte under ambient temperature and pressure conditions. In accordance with this invention, elemental sulfur should be added only to those cathode-electrolytes in which sulfur is not formed as a cell discharge product. For example, elemental sulfur should not be employed with thionyl chloride.

The amount of sulfur in the sulfur compounds can vary between about 0.05 and about 10 weight percent based on the weight of the cathode-electrolyte. Preferably, the amount of the sulfur in the sulfur compounds should be between about 0.05 and about 1.5 weight percent based on the weight of the cathode-electrolyte. An amount of sulfur in the sulfur compounds below about 0.05 weight percent would be undesirable because it would be insufficient to effectively eliminate passivation of the anode while an amount above about 10 weight percent would result in an unacceptable reduction of the capacity of a fixed size cell due to displacement of the active liquid cathode material by the sulfur compound additive.

As used herein and as described in an article titled "Electrochemical Reactions In Batteries" by Akiya Kozawa and R. A. Powers in the Journal of Chemical Education—Vol. 49, pages 587 to 591, September 1972 edition, a cathode depolarizer is the cathode reactant and, therefore, is the material electrochemically reduced at the cathode. The cathode collector is not an active reducible material and functions as a current collector plus electronic conductor to the positive (cathode) terminal of a cell. In other words, the cathode collector is a situs for the electrochemical reduction reaction of the active cathode material and the electronic conductor to the cathode terminal of a cell.

A liquid active reducible cathode material (depolarizer) can either be mixed with a conductive solute which is a nonreactive material but is added to improve conductivity of the liquid active reducible cathode materials, or it can be mixed with both a conductive solute and a reactive or nonreactive cosolvent material. A reactive cosolvent material is one that is electrochemically active and, therefore, functions as an active cathode material while a nonreactive cosolvent material is one that is electrochemically inactive and, therefore, cannot function as an active cathode material.

Any compatible solid which is substantially electronically conductive will be useful as a cathode collector in the cells of the present invention.

It is desirable to have as much surface contact as possible between the cathode-electrolyte and the collector. It is, therefore, preferred to employ a porous collector since it will provide a high surface area interface with the liquid cathode-electrolyte. The collector may be metallic and may be present in any physical form such as a metallic film, screen or a pressed powder. Preferably, however, a pressed powder collector should be at least partially of carbonaceous or other high surface area material.

The solute may be a simple or double salt which will produce an ionically conductive solution when dissolved in the solvent. Preferred solutes are complexes of inorganic or organic Lewis acids and inorganic ionizable salts. The only requirements for utility are that the salt, whether simple or complex, be compatible with the solvent being employed and that it yield a solution which is ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226—July/December, 1938, pages 293-313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron fluoride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

It will be obvious to those skilled in the art that the double salts formed by a Lewis acid and an inorganic ionizable salt may be used as such or the individual components may be added to the solvent separately to form the salt or the resulting ions in situ. One such double salt, for example, is that formed by the combination of aluminum chloride and lithium chloride to yield lithium aluminum tetrachloride.

In accordance with the present invention, there is provided a nonaqueous electrochemical system comprising an active metal anode, a cathode collector and a cathode-electrolyte, said cathode-electrolyte comprising a solute dissolved in an active reducible cathode solvent of an oxyhalide of a Group V or Group VI element of the Periodic Table with or without a cosolvent. The active reducible electrolyte solvent performs the dual function of acting as solvent for the electrolyte salt and as an active cathode depolarizer of the cell. The term "cathode-electrolyte" is used herein to describe electrolytes containing solvents that can perform this dual function.

The use of a single component of the cell as both an electrolyte solvent and active cathode depolarizer is a relatively recent development since previously it was generally considered that the two functions were necessarily independent and could not be served by the same material. For an electrolyte solvent to function in a cell, it is necessary that it contact both the anode and the cathode depolarizer so as to form a continuous ionic path therebetween. Thus it has generally been assumed that the active cathode material must never directly contact the anode and, therefore, it appeared that the two functions were mutually exclusive. However, it has recently been discovered that certain active cathode materials, such as the liquid oxyhalides, do not appreciably react chemically with an active anode metal at the interface between the metal and the cathode material, thereby allowing the cathode material to contact the anode directly and act as the electrolyte carrier. While the theory behind the cause of the inhibition of direct chemical reaction is not fully understood at the present time, and the applicant does not desire to be limited to any theory of invention, it appears that direct chemical reaction is inhibited either by an inherently high activation energy of reaction or the formation of a thin, protective film on the anode surface. Any protective film on the anode surface must not be formed to such an excess that a large increase in anode polarization results.

Although the active reducible liquid oxyhalides inhibit the direct reaction of active metal anode surfaces sufficiently to permit them to act as both the cathode material and as the electrolyte carrier for nonaqueous cells, they do cause formation of a surface film on the active metal anode during cell storage particularly at elevated temperatures, which consists of a rather heavy layer of crystalline material. This crystalline layer appears to cause passivation of the anode which results in voltage delay on initial discharge along with high cell impedance values in the range of 11 to 15 ohms for a standard C-size cell.

The extent of anode passivation can be measured by observing the time required for the closed-circuit voltage of the stored cell to reach its intended voltage level after discharge has begun. If this delay exceeds 20 seconds, the anode passivation would be considered excessive for most applications. What has been observed, for example, in lithium-oxyhalide cell systems is that after a load is applied across the terminals of the cell, the cell voltage immediately drops below the intended discharge level, then increases at a rate depending on temperature, the thickness of the crystalline layer, and the electrical load.

The exact composition of this layer is not known. The thickness and density of the crystalline layer as well as the size and shape of the crystals were observed to vary with the length of the storage period and also with the temperature during storage, e.g., at low temperatures there is relatively little growth of the crystalline layer as compared to the greater growth of the layer at higher temperatures of about 70° C. It has also been observed that when the oxyhalides, such as thionyl or sulfuryl chloride, are saturated with $SO_2$ and then placed in a lithium anode cell, a crystalline layer rapidly forms on the lithium surface thereby passivating the lithium.

In accordance with the present invention, it has been found that the sulfur-containing member, such as elemental sulfur or sulfur compounds, added to the cathode-electrolyte of an oxyhalide cell will effectively decrease passivation of the metal anode thereby substantially minimizing the initial voltage delay of the cell when discharged.

Various techniques may be used to incorporate the sulfur-containing member into the liquid cathodeelectrolyte. For example, the additive may be incorporated in the cell by placing in contact with the electrolyte elemental sulfur, a salt, such as lithium sulfide ($Li_2S$), or by adding small amounts of sulfur halides, such as $S_2Cl_2$, $SCl_2$, etc.

The lithium sulfide salt, which is the preferred additive, may be introduced either directly into the liquid cathode-electrolyte (oxyhalide solvent with salts) or into the pure solvent. It is believed that the lithium sulfide salt does not simply dissolve in oxyhalides, such as sulfuryl chloride, but it appears to react with them. During the chemical reaction, heat is liberated. It was also observed that lithium aluminum chloride ($LiAlCl_4$) accelerates the reaction between lithium sulfide and the oxyhalide solvents. Therefore, it is believed advantageous to add the sulfide first to the solvent and then add the aluminum salt. The aluminum salt can be either $AlCl_3$ or $LiAlCl_4$ since lithium chloride is also being formed during the reaction of $Li_2S$ salt and the oxyhalide solvent, that is, $AlCl_3$ can be used along with a sufficient quantity of lithium sulfide to obtain the desired level of $LiAlCl_4$ in solution. This latter method will eliminate the accumulation of undesirable lithium chloride after the $Li_2S$ addition. Consequently, the preferred method for adding lithium sulfide to the oxyhalide solvent is to first add the sulfide salt to the oxyhalide solvent, followed by the addition of $AlCl_3$ whereupon the solution is mixed and allowed to stand for a sufficient time period to permit reaction to occur.

It is believed that one of the products formed between lithium sulfide and the oxyhalide solvent is a polymerized sulfur oxide material in solution. This material not only protects the lithium from developing thick layers of corrosion products on its surface but has also been found to improve the cathode activity by reducing polarization.

The preferred embodiment of this invention is to add the sulfur-containing member into the electrolyte and, in addition, to coat the anode electrode in accordance with the teachings of U.S. Pat. No. 3,993,501.

Suitable oxyhalides for use in this invention include sulfuryl chloride, thionyl chloride, phosphorus oxychloride, thionyl bromide, chromyl chloride, vanadyl tribromide and selenium oxychloride.

Useful organic cosolvents for use in this invention include the following classes of compounds:

Trialkyl borates: e.g., trimethyl borate, $(CH_3O)_3B$ (liquid range $-29.3°$ to 67° C.)

Tetraalkyl silicates: e.g., tetramethyl silicate, $(CH_3O)_4Si$ (boiling point 121° C.)

Nitroalkanes: e.g., nitromethane, $CH_3NO_2$ (liquid range $-17°$ to 100.8° C.)

Alkylnitriles: e.g., acetonitrile, $CH_3CN$ (liquid range $-45°$ to 81.6° C.)

Dialkylamides: e.g., dimethylformamide, $HCON(CH_3)_2$ (liquid range $-60.48$ to 149° C.)

Lactams: e.g., N-methylpyrrolidone,

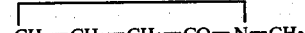

(liquid range $-16°$ to 202° C.)

Tetraalkylureas: e.g., tetramethylurea, $(CH_3)_2N$-$CO$-$N(CH_3)_2$ (liquid range $-1.2°$ to 166° C.)

Monocarboxylic acid esters: e.g., ethyl acetate (liquid range $-83.6°$ to 77.06° C.)

Orthoesters: e.g., trimethylorthoformate, $HC(OCH_3)_3$ (boiling point 103° C.)

Lactones: e.g., γ-(gamma)butyrolactone,

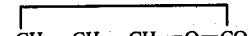

(liquid range $-42°$ to 206° C.)

Dialkyl carbonates: e.g., dimethyl carbonate, $OC(OCH_3)_2$ (liquid range 2° to 90° C.)

Alkylene carbonates: e.g., propylene carbonate,

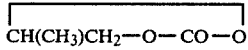

(liquid range −48° to 242° C.)
Monoethers: e.g., diethyl ether (liquid range −116° to 34.5° C.)
Polyethers: e.g., 1,1- and 1,2-dimethoxyethane (liquid ranges −113.2° to 64.5° C. and −58° to 83° C., respectively)
Cyclic ethers: e.g., tetrahydrofuran (liquid range −65° to 67° C.); 1,3-dioxolane (liquid range −95° to 78° C.)
Nitroaromatics: e.g., nitrobenzene (liquid range 5.7 to 210.8° C.)
Aromatic carboxylic acid halides: e.g., benzoyl chloride (liquid range 0° to 197° C.); benzoyl bromide (liquid range −24° to 218° C.)
Aromatic sulfonic acid halides: e.g., benzene sulfonyl chloride (liquid range 14.5° to 251° C.)
Aromatic phosphonic acid dihalides: e.g., benzene phosphonyl dichloride (boiling point 258° C.)
Aromatic thiophosphonic acid dihalides: e.g., benzene thiophosphonyl dichloride (boiling point 124° C. at 5 mm.)
Cyclic sulfones: e.g., sulfolane,

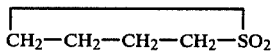

(melting point 22° C.); 3-methylsulfolane (melting point −1° C.)
Alkyl sulfonic acid halides: e.g., methanesulfonyl chloride (boiling point 161° C.)
Alkyl carboxylic acid halides: e.g., acetyl chloride (liquid range −112° to 50.9° C.); acetyl bromide (liquid range −96° to 76.° C.); propionyl chloride (liquid range −94° to 80° C.)
Saturated heterocyclics: e.g., tetrahydrothiophene (liquid range −96° to 121° C.); 3-methyl-2-oxazolidone (melting point 15.9° C.)
Dialkyl sulfamic acid halides: e.g., dimethyl sulfamyl chloride (boiling point 80° C., 16 mm.)
Alkyl halosulfonates: e.g., ethyl chlorosulfonate (boiling point 151° C.)
Unsaturated heterocyclic carboxylic acid halides: e.g., 2-furoyl chloride (liquid range −2° to 173° C.)
Five-membered unsaturated heterocyclics: e.g., 3,5-dimethylisoxazole (boiling point 140° C.); 1-methylpyrrole (boiling point 114° C.); 2,4-dimethylthiazole (boiling point 144° C.); furan (liquid range −85.65° to 31.36° C.)
Esters and/or halides of dibasic carboxylic acids: e.g., ethyl oxalyl chloride (boiling point 135° C.)
Mixed alkyl sulfonic acid halides and carboxylic acid halides: e.g., chlorosulfonyl acetyl chloride (boiling point 98° C. at 10 mm.)
Dialkyl sulfoxides: e.g., dimethyl sulfoxide (liquid range 18.4° to 189° C.)
Dialkyl sulfates: e.g., dimethylsulfate (liquid range −31.75° to 188.5° C.)
Dialkyl sulfites: e.g., dimethylsulfite (boiling point 126° C.)
Alkylene sulfites: e.g., ethylene glycol sulfite (liquid range −11° to 173° C.)
Halogenated alkanes: e.g., methylene chloride (liquid range −95° to 40° C.); 1,3-dichloropropane (liquid range −99.5° to 120.4° C.).

Of the above, the preferred cosolvents are nitrobenzene; tetrahydrofuran; 1,3-dioxolane; 3-methyl-2-oxazolidone; propylene carbonate; γ-butyrolactone; sulfolane; ethylene glycol sulfite; dimethyl sulfite and benzoyl chloride. Of the preferred cosolvents, the best are nitrobenzene; 3-methyl-2-oxazolidone; benzoyl chloride; dimethyl sulfite and ethylene glycol sulfite because they are more chemically inert to battery components and have long liquid ranges, and especially because they permit highly efficient utilization of the cathode materials.

It is also within this invention to employ inorganic cosolvents such as inorganic halides, e.g., selenium tetrafluoride ($SeF_4$), selenium monobromide ($Se_2Br_2$), thiophosphoryl chloride ($PSCl_3$), thiophosphoryl bromide ($PSBr_3$), vanadium pentafluoride ($VF_5$), lead tetrachloride ($PbCl_4$), titanium tetrachloride ($TiCl_4$), disulfur decafluoride ($S_2F_{10}$), tin bromide trichloride ($SnBrCl_3$), tin dibromide dichloride ($SnBr_2Cl_2$) and tin tribromide chloride ($SnBr_3Cl$). These halides, in addition to functioning as an electrolyte solvent in nonaqueous cells, will also function as an active reducible cathode thereby contributing to the overall active reducible material in such cells.

Useful anode materials are generally consumable metals and include aluminum, the alkali metals, alkaline earth metals and alloys of alkali metals or alkaline earth metals with each other and other metals. The term "alloy" as used herein and in the appended claims is intended to include mixtures, solid solutions such as lithium-magnesium, and intermetallic compounds such as lithium monoaluminide. The preferred anode materials are the alkali metals such as lithium, sodium and potassium, and alkaline earth metals such as calcium.

In selecting the particular oxyhalide for a particular cell in accordance with this invention, one should also consider the stability of the particular oxyhalide in the presence of the other cell components and operating temperatures at which the cell is expected to perform. Thus an oxyhalide should be selected that will be stable in the presence of the other cell components.

In addition, if it is desired to render the electrolyte solution more viscous or convert it into a gel, a gelling agent such as colloidal silica may be added.

The following examples are illustrative of the present invention and are not intended in any manner to be limitative thereof.

BRIEF DESCRIPTION OF THE DRAWING

FIGS. 1 to 9A and B are plots of voltage versus time curves for the data obtained from Examples III to XI, respectively.

EXAMPLE I

A cathode-electrolyte of this invention containing a lithium sulfide additive was prepared in the following manner. In 100 grams of thionyl chloride ($SOCl_2$), about 7.5 grams of anhydrous aluminum trichloride ($AlCl_3$) were dissolved. This was followed by the slow addition of about 1.4 grams of lithium sulfide ($Li_2S$) while the solution was being stirred. The chemical reaction was accompanied by heat generation so that the sulfide had to be added carefully. At this point the solution was allowed to stand for a few hours before use. The resulting liquid cathode-electrolyte was approximately 1 M LiAlCl$_4$ in SOCl$_2$ with no excess LiCl formation.

EXAMPLE II

A liquid cathode-electrolyte of this invention was prepared by adding lithium sulfide directly to a liquid cathode-electrolyte as follows. Starting with a 1 M solution of LiAlCl$_4$ in sulfuryl chloride (about 100 grams of SO$_2$Cl$_2$ and 10 grams of LiAlCl$_4$), 0.5 gram of lithium sulfide was added. Again, the additive was slowly added while the solution was being stirred. After adding the sulfide, the solution was aged for more than 24 hours until a bright yellowish red color developed. The cathode-electrolyte so prepared was then ready for use in a cell.

EXAMPLE III

Four "C" sized cells were prepared employing the following components:

3.5 grams of lithium extruded into a stainless steel container;

a felted nonwoven glass fiber separator in contact with the lithium anode;

a cathode collector-bobbin made from 3.5 to about 3.6 grams of a mixture of 75 weight percent carbon black and 25 weight percent Teflon* binder; and 12 ml of a liquid cathode-electrolyte solution of 1 molar LiAlCl$_4$ in SO$_2$Cl$_2$.

*Trademark for polytetrafluoroethylene

The cell containers were sealed in a conventional manner.

Figure 1:
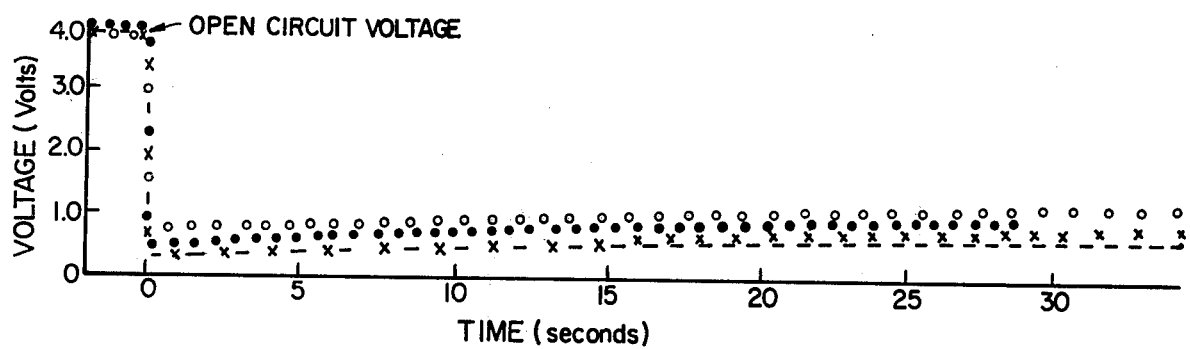

The cells were stored for three months at 25° C. and then discharged across a 20-ohm resistor. The resulting discharge curves are shown in FIG. 1. In addition, the initial impedance and the final impedance for each of the cells are shown in Table 1.

TABLE 1

| Sample Cell | Initial Impedance | Final Impedance |
| --- | --- | --- |
| A | 5.70 ohms | 21.0 ohms |
| B | 6.10 ohms | 25.7 ohms |
| C | 5.55 ohms | 16.0 ohms |
| D | 8.80 ohms | 30.3 ohms |

EXAMPLE IV

Figure 2:
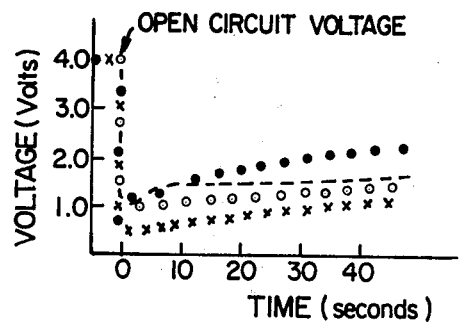

Four identical cells were produced as in Example III with the exception that lithium sulfide was added up to the saturation point in the cathode-electrolyte. The cells were stored for three months at 25° C. and then discharged through a 20-ohm resistor. The resulting curves are shown in FIG. 2. As is apparent from the comparison of the results of FIG. 1 and FIG. 2, the cells employing the lithium sulfide additive substantially suppressed the initial voltage delay observed upon commencement of discharge of the cells.

EXAMPLE V

Figure 3:
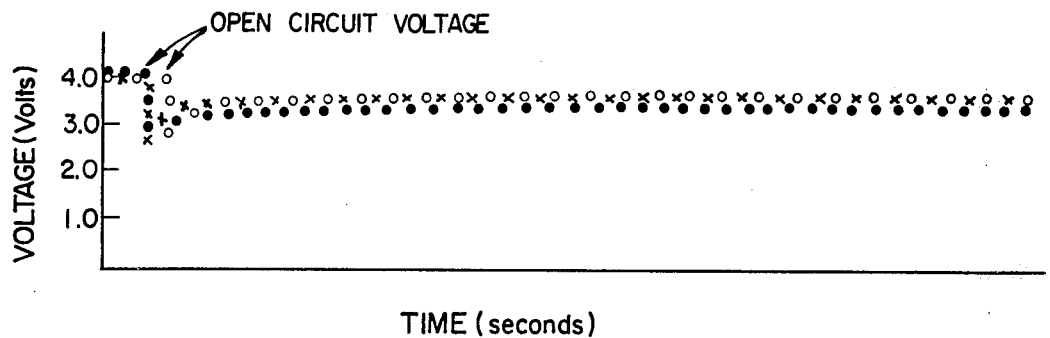

Three "C" sized cells were produced as in Example IV with the exception that the lithium anode was coated with a vinyl chloride-vinyl acetate copolymer (obtained commercially from Union Carbide as VYHH consisting of 86% vinyl chloride and 14% vinyl acetate with an average molecular weight of about 40,000). The vinyl coating was deposited as a four percent solution of VYHH dissolved in SOCl$_2$ and after drying the thickness of the deposited coating was between 0.001 and 0.0015 inch. The three cells so produced were stored for three months at 25° C. and then discharged across a 20-ohm resistor. The discharge curves observed are shown in FIG. 3. The initial impedance and the final impedance of the three cells are shown in Table 2.

TABLE 2

| Sample Cell | Initial Impedance | Final Impedance |
| --- | --- | --- |
| A | 1.56 ohms | 2.49 ohms |
| B | 1.49 ohms | 2.33 ohms |
| C | 1.39 ohms | 4.95 ohms |

As is apparent from the comparision of the discharge curves in FIGS. 1 to 3, the employment of an additive to the cathode-electrolyte in accordance with this invention in conjunction with the coating of the anode in accordance with the teachings in U.S. Pat. No. 3,993,501 will substantially suppress and eliminate the initial voltage delay normally observed in nonaqueous cells employing oxyhalides as the active cathode material.

EXAMPLE VI

Figure 4:
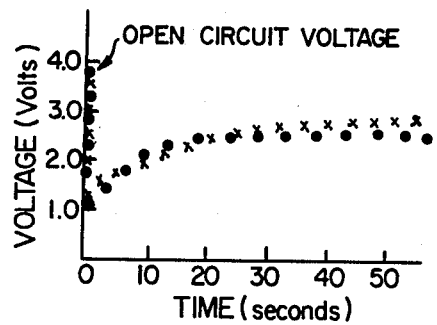

Two cells were prepared as in Example III with the exception that elemental sulfur (10 wt. %) was added to the cathode-electrolyte and in addition the anode was coated with a vinyl acetate-vinyl chloride copolymer (VYNW) from a 3% solution in SOCl$_2$. The cathode-electrolyte consisted of 1 molar LiAlCl$_4$ dissolved in SO$_2$Cl$_2$. Cells were stored for three months at 25° C. and then discharged across a 20-ohm resistor. The resultant discharge curves are shown in FIG. 4.

EXAMPLE VII

Figure 5:
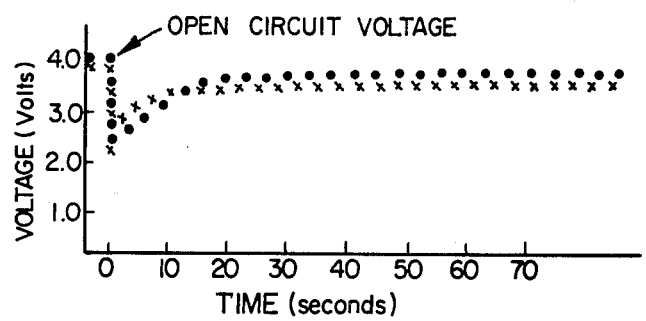

Two cells were prepared as in Example VI except that the additive to the cathode-electrolyte was 5 weight percent SCl$_2$. Cells were stored for three months at 25° C. and then discharged across a 20-ohm resistor. The resultant discharge curves are shown in FIG. 5.

EXAMPLE VIII

Figure 6:
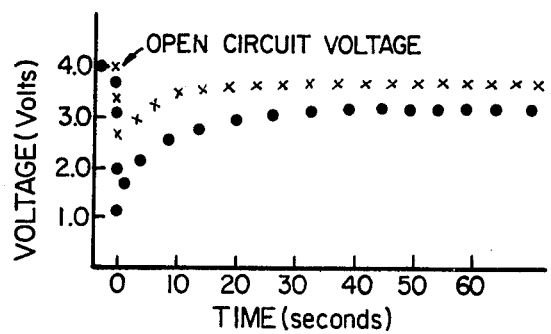

Two cells were prepared as in Example VI except that the additive was 5 weight percent S$_2$Cl$_2$. The cells were stored for three months at 25° C. and then discharged across a 20-ohm resistor. The resultant discharge curves are shown in FIG. 6.

EXAMPLE IX

Two cells were prepared as in Example VII and were stored at 54° C. for one month before being discharged across a 20-ohm resistor. Discharge curves so obtained are shown in FIG. 7.

EXAMPLE X

Two cells were prepared as in Example VIII and were stored for one month at 54° C. and then discharged across a 20-ohm resistor. The discharge curves so produced are shown in FIG. 8.

EXAMPLE XI

To show that a lithium sulfide additive to the cathode-electrolyte in accordance with this invention also has a beneficial effect on the cathode performance, a 0.475 inch diameter cell was prepared employing the internal anode construction as substantially disclosed in U.S. Pat. No. 4,032,696 with the exception that a lithium reference electrode was incorporated in the cell. The cell utilized 2.5 ml of 1 molar LiAlCl$_4$-SO$_2$Cl$_2$ electrolyte, a vinyl-coated lithium anode (0.45 gram lithium), a Teflon bonded carbon cathode collector and a felted unwoven glass fiber separator. The cathode collector was made of about 1 gram of mix containing 90 weight percent acetylene black and 10 weight percent Teflon based on the dry weight of the finished collector. The cells were aged at room temperature (25° C.) for six weeks prior to discharge through a 75-ohm resistor. A similar cell was produced with the exception that lithium sulfide was added to the cathode-electrolyte in an amount of 2 weight percent based on the weight of the electrolyte. The discharge curves of the two cells across a 75-ohm resistor are shown in FIG. 9A with curve A representing the cell without the additive and curve B representing the cell employing lithium sulfide. Shown in FIG. 9B is the voltage of the cathode versus the lithium reference electrode for the two cells. As is evidenced from the data in the discharge curves, the use of the lithium sulfide additive to the cathode-electrolyte also provides a beneficial effect on the cathode performance.

While the present invention has been described with reference to many particular details thereof, it is not intended that these details should be construed as limiting the scope of the invention.

What is claimed is:

1. A nonaqueous cell comprising an active metal anode, a cathode collector and an ionically conductive cathode-electrolyte solution containing a solute dissolved in at least one liquid oxyhalide of an element of Group V or Group VI of the Periodic Table, the improvement comprising incorporating into said cathode-electrolyte at least one sulfurcontaining member represented by the formula $M_xS_yY_z$ wherein M is an alkali or alkaline earth metal, S is sulfur and Y is chlorine or bromine and wherein x is an integer having a value of 0 to 2, y is an integer having a value of 1 to 14, and z is an integer having a value of 0 to 2, with the proviso that when z is other than 0 then x is 0, that when x is other than 0 then z is 0, when x and z are 0 and the oxyhalide employed does not form sulfur as a cell discharge product, then the sulfur incorporated in the cathode-electrolyte is from 1 weight percent based on the weight of the cathode-electrolyte up to the quantity of sulfur that will dissolve in the cathode-electrolyte at ambient temperature and pressure, and that when x or z are other than 0, then the sulfur-containing member is incorporated in the cathode-electrolyte contains sulfur in an amount between about 0.05 and about 10 weight percent based on the weight of the cathode-electrolyte.

2. The nonaqueous cell of claim 1 wherein y is an integer having a value of 1 to 6.

3. The nonaqueous cell of claim 1 wherein x or z is other than 0 and the sulfur in the sulfur-containing member is between about 0.05 and about 1.5 weight percent based on the weight of the cathode-electrolyte.

4. The nonaqueous cell of claim 1 wherein the anode is coated with a vinyl polymer film.

5. The nonaqueous cell of claim 1 wherein the at least one sulfur-containing member is selected from the group consisting of lithium sulfide ($Li_2S$), sulfur monochloride ($S_2Cl_2$) and sulfur dichloride ($SCl_2$).

6. The nonaqueous cell of claim 5 wherein the anode is coated with a vinyl polymer film.

7. The nonaqueous cell of claim 4 wherein the at least one sulfur-containing member is selected from the group consisting of lithium sulfide and sulfur monochloride.

8. The nonaqueous cell of claim 7 wherein the anode is coated with a vinyl polymer film.

9. The nonaqueous cell of claim 4 wherein the sulfur-containing member is lithium sulfide.

10. The nonaqueous cell of claim 9 wherein the anode is coated with a vinyl polymer film.

11. The nonaqueous cell of claim 1 wherein the at least one liquid oxyhalide is selected from the group consisting of thionyl chloride, sulfuryl chloride, phosphorous oxychloride, thionyl bromide, chromyl chloride, vanadyl tribromide and selenium oxychloride.

12. The nonaqueous cell of claim 11 wherein the at least one liquid oxyhalide is selected from the group consisting of thionyl chloride and sulfuryl chloride.

13. The nonaqueous cell of claim 11 wherein the anode is lithium coated with a vinyl polymer film, the liquid oxyhalide is thionyl chloride and the at least one sulfur-containing member is selected from the group consisting of lithium sulfide and sulfur monochloride.

14. The nonaqueous cell of claim 11 wherein the anode is lithium coated with a vinyl polymer film, the liquid oxyhalide is sulfuryl chloride and the at least one sulfur-containing member is selected from the group consisting of lithium sulfide and sulfur monochloride.

15. The nonaqueous cell of claim 1 wherein the solute is a complex salt of a Lewis acid and an inorganic ionizable salt.

16. The nonaqueous cell of claim 1 wherein the anode is selected from the group consisting of lithium, sodium, calcium and potassium.

* * * * *